(12) United States Patent
Feng

(10) Patent No.: US 12,013,077 B2
(45) Date of Patent: Jun. 18, 2024

(54) CONSTANT FORCE LIFTING BRACKET

(71) Applicant: DongGuan KINGEASY Hardware Technology CO., LTD, Dongguan (CN)

(72) Inventor: Bo Feng, Dongguan (CN)

(73) Assignee: DongGuan KINGEASY Hardware Technology CO., LTD, Dongguan (CN)

( * ) Notice: Subject to any disclaimer, the term of this patent is extended or adjusted under 35 U.S.C. 154(b) by 0 days.

(21) Appl. No.: 18/073,904

(22) Filed: Dec. 2, 2022

(65) Prior Publication Data
US 2024/0019074 A1 Jan. 18, 2024

(30) Foreign Application Priority Data
Jul. 18, 2022 (CN) .......................... 202221884901.8

(51) Int. Cl.
*F16M 11/04* (2006.01)
(52) U.S. Cl.
CPC ......... *F16M 11/046* (2013.01); *F16M 11/048* (2013.01)
(58) Field of Classification Search
CPC .... F16M 11/048; F16M 11/043; F16M 11/22; F16M 11/26
USPC .................. 248/121, 125.1, 125.2, 125.3
See application file for complete search history.

(56) References Cited

U.S. PATENT DOCUMENTS

| 9,718,659 | B2 * | 8/2017 | Huang | ........................ B66F 9/06 |
| 2007/0137535 | A1 * | 6/2007 | Jones | ........................ A47B 9/02 108/147 |
| 2012/0112035 | A1 * | 5/2012 | Volke | ...................... B61D 37/00 248/157 |
| 2013/0256489 | A1 * | 10/2013 | Ergun | .................... F16M 13/02 248/297.11 |
| 2014/0109803 | A1 * | 4/2014 | Sweere | ..................... A47B 9/20 248/188.5 |
| 2015/0053830 | A1 * | 2/2015 | Kuo | ...................... F16M 11/046 248/297.11 |

\* cited by examiner

*Primary Examiner* — Alfred J Wujciak
(74) *Attorney, Agent, or Firm* — Jeenam Park

(57) ABSTRACT

A constant force lifting bracket, comprising a fixed bracket and a lifting slide seat, the lifting slide seat is connected to the fixed bracket by sliding up and down, wherein the fixed bracket is provided with a wheel and a movable block, and a side wall of one side of the wheel is provided with a cam, and the movable block is connected with the lifting slide seat by passing a pull cord around the cam and the wheel in turn, an end of the pull cord close to the movable block is sleeved with a pressure spring, an upper end of the pressure spring abuts against the fixed bracket, and a lower end of the pressure spring abuts against the movable block. The present application can realize the height adjustment of the display screen and enable the screen to hover at any height, which is more convenient to use.

8 Claims, 6 Drawing Sheets

CONSTANT FORCE LIFTING BRACKET

CROSS-REFERENCE TO RELATED APPLICATIONS

This application claims the benefit and priority of Chinese patent application. No. 202221884901.8, filed on Jul. 18, 2022, disclosure of which is hereby incorporated by reference in its entirety.

TECHNICAL FIELD

The present application relates to the technical field of brackets, in particular to a constant force lifting bracket.

BACKGROUND

A bracket is a product used to support a component (such as a display) so that the component can be fixed at a certain height and remain stable. Traditional brackets and display screens are mostly fixedly connected, which makes the height of the display screen unable to be adjusted, which is inconvenient to use.

SUMMARY

Aiming at the deficiency of the prior art, the present application provides a constant force lifting bracket, which can realize the height adjustment of the display screen, and enables the screen to hover at any height, which is more convenient to use.

In order to achieve the above object, the present application adopts the following technical solutions:

A constant force lifting bracket, comprising a fixed bracket and a lifting slide seat, the lifting slide seat is connected to the fixed bracket by sliding up and down, the fixed bracket is provided with a wheel and a movable block, and a side wall of one side of the wheel is provided with a cam, and the movable block is connected with the lifting slide seat by passing a pull cord around the cam and the wheel in turn, an end of the pull cord close to the movable block is sleeved with a pressure spring, an upper end of the pressure spring abuts against the fixed bracket, and a lower end of the pressure spring abuts against the movable block.

By arranging the wheel, movable block and pressure spring on the fixed bracket, and arranging a cam on one side of the wheel, the movable block is connected with the lifting slide seat by passing a pull cord around the cam and the wheel, and the pressure spring is sleeved on the pull rope, and the two ends of the pressure spring abut against the fixed bracket and the movable block respectively, thereby fixing the display screen on the lifting slide seat. When moving the display screen up and down, there is always the weight of the display screen*the radius of the wheel R=the elastic force of the pressure spring*the radius of curvature r, so that the height adjustment of the display screen can be realized, and the screen can hover at any height, which is more convenient to use.

As a preferred solution, an elastic force adjustment assembly is provided on the fixed bracket, and the elastic force adjustment assembly comprises a lifting block and an adjustment screw, the adjusting screw extends vertically and is rotatably connected with the fixed bracket, the threaded section of the adjusting screw is threadedly connected with the lifting block, and the upper end of the pressure spring abuts against the lifting block.

As a preferred solution, the lifting block comprises a limiting groove with an opening facing downward, the upper end of the pressure spring extends into the limiting groove, and the limiting groove comprises a give way, through hole for the pull cord to pass upward.

As a preferred solution, an adjustment base is fixed on the fixed bracket, and the adjustment screw is rotatably connected to the adjustment base.

As a preferred solution, a vertically extending sleeve is provided on the fixed bracket, and the sleeve comprises a guide groove adapted to the movable block, wherein when assembling, the movable block is placed in the guide groove and can move up and down along the guide groove, and the lower end of the pressure spring extends into the guide groove.

As a preferred solution, the guide groove runs through the lower end surface of the sleeve.

As a preferred solution, an arc surface with a gradually increasing or decreasing radius of curvature is formed on the peripheral side of the cam.

As a preferred solution, one side of the fixed bracket is provided with a concave accommodating groove, and the lifting slide seat, the wheel and the pressure spring are all arranged in the accommodating groove.

As a preferred solution, a left and right side walls in the accommodation groove are provided with steel ball slide rails, and the lifting slide seat is slidably connected with the fixed bracket up and down through the steel ball slide rails.

As a preferred solution, the lower end of the fixed bracket is connected with a base.

Compared with the prior art, the present application has obvious advantages and beneficial effects. Specifically, by arranging the wheel, movable block and pressure spring on the fixed bracket, and arranging a cam on one side of the wheel, the movable block is connected with the lifting slide seat by passing a pull cord around the cam and the wheel, and the pressure spring is sleeved on the pull rope, and the two ends of the pressure spring abut against the fixed bracket and the movable block respectively, thereby fixing the display screen on the lifting slide seat. When moving the display screen up and down, there is always the weight of the display screen*the radius of the wheel R=the elastic force of the pressure spring*the radius of curvature r, so that the height adjustment of the display screen can be realized, and the screen can hover at any height, which is more convenient to use; At the same time, the structure is simple, the manufacturing cost is low, and it is beneficial to popularize and use; By arranging the elastic force adjustment assembly composed of the lifting block and the adjusting screw, the upward and downward movement of the lifting block can fine-tune the elastic force of the pressure spring. When the lifting slide seat carries the display screens with different weights, the matching elastic force can be adjusted correspondingly; which has good versatility and high height adjustment accuracy.

In order to more clearly illustrate the structural features, technical means and the specific purpose and functions achieved by the present application, the present application will be further described in detail below in conjunction with the accompanying drawings and specific embodiments:

REFERENCE SIGNS

Figure 1:
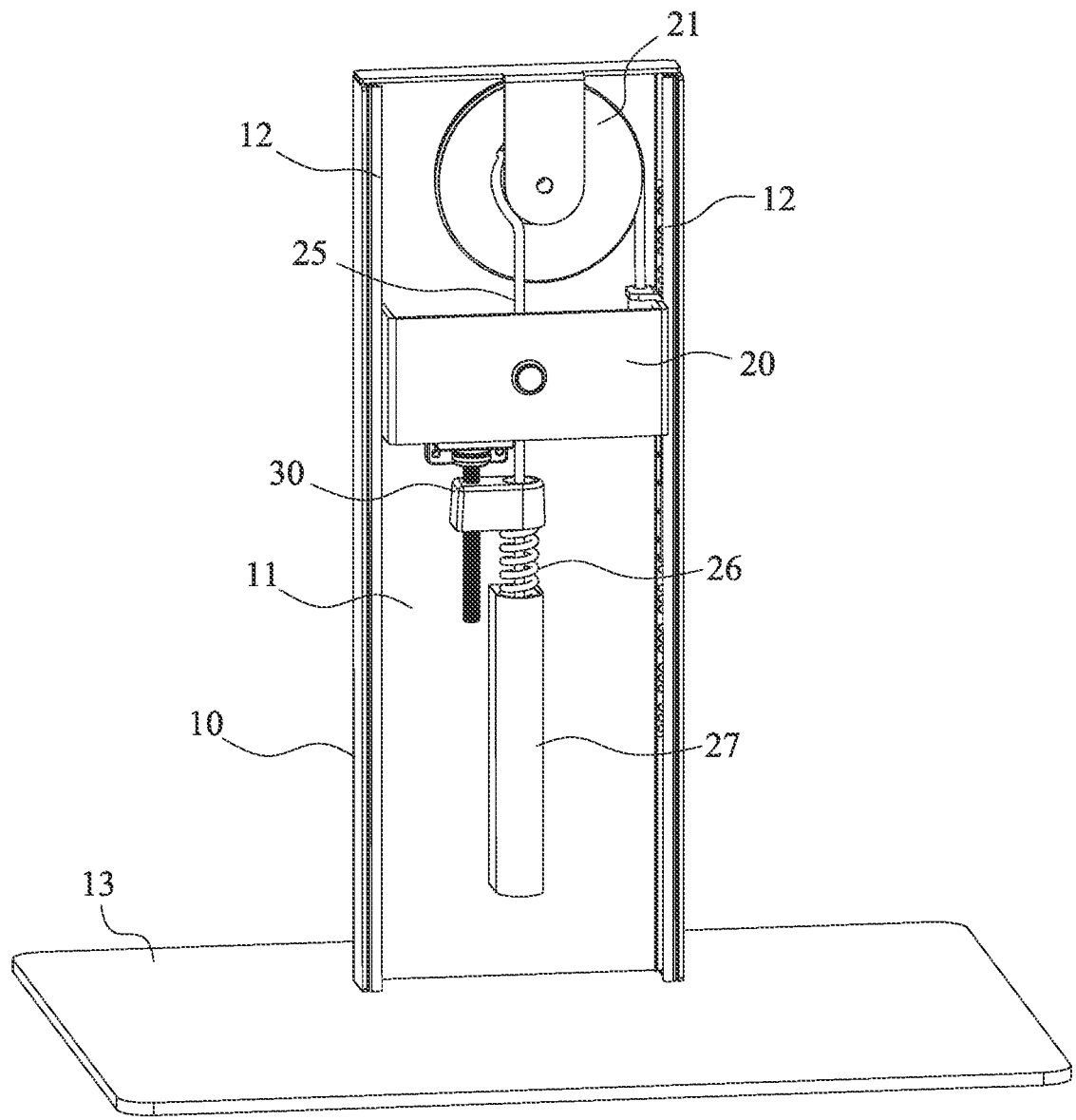
FIG. 1 is the assembly schematic structural diagram of the embodiment of the present application.
Figure 2:
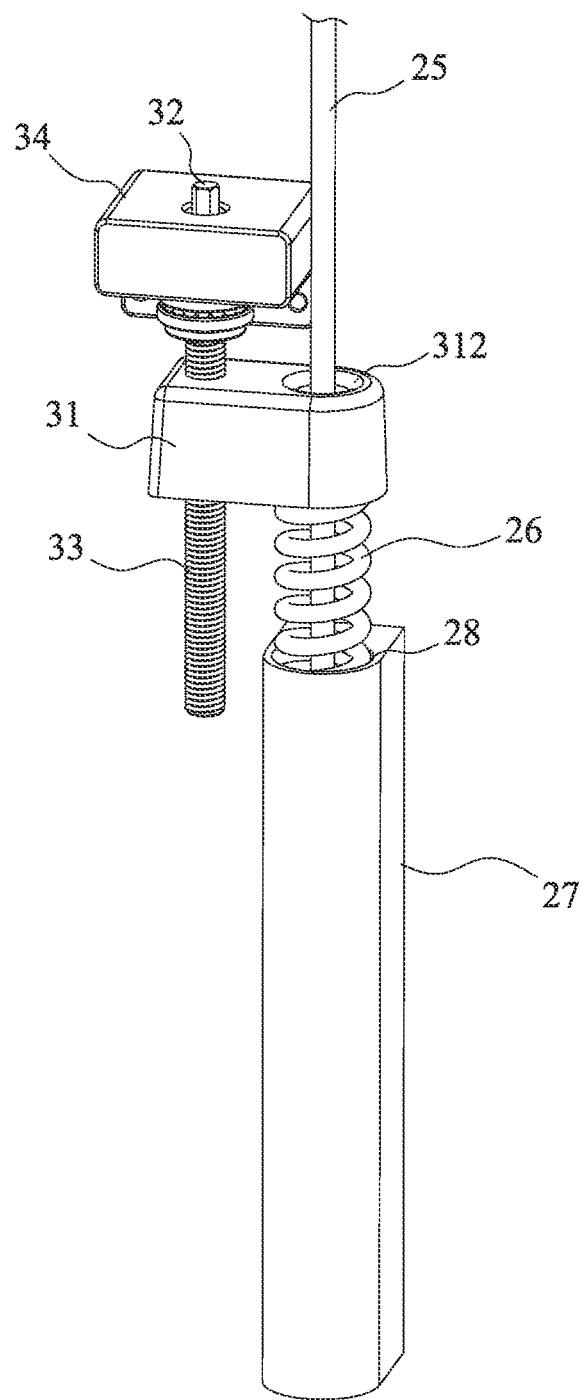
FIG. 2 is the assembly schematic diagram of the elastic force adjustment assembly, the sleeve and the pressure spring of the embodiment of the present application.
Figure 3:
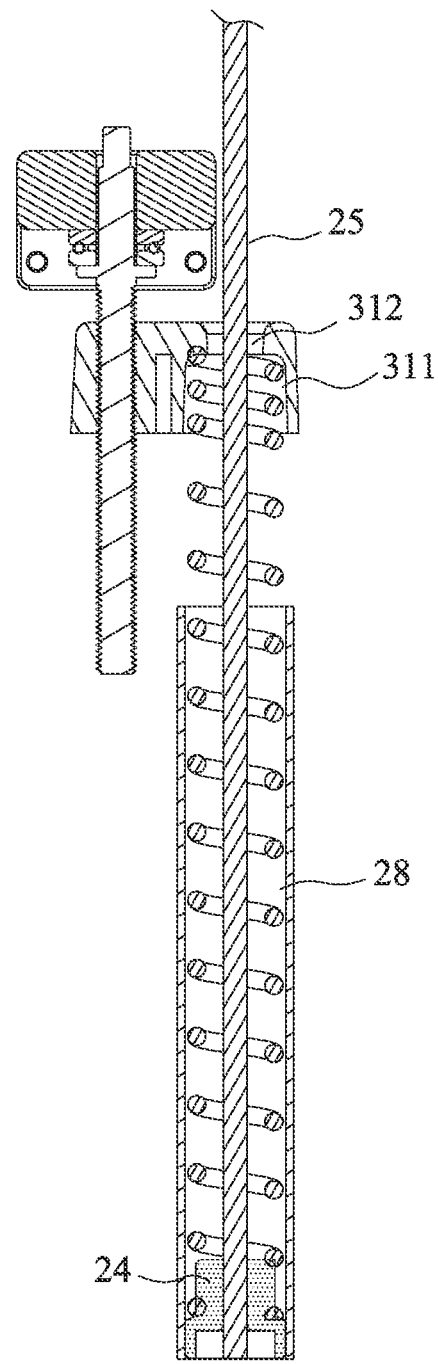
FIG. 3 is a schematic cross-sectional view of FIG. 2.

10—Fixing bracket; 11—Accommodating groove; 12—Steel ball slide rail; 13—Base; 20—Lift slide seat; 21—Wheel; 22—Cam; 23—Arc surface; 24—Movable block; 25—Pull rope; 26—Pressure spring; 27—Sleeve; 28—Guide groove; 30—Elastic force adjustment assembly; 31—Lifting block; 311—Limiting groove; 312—Give way through hole; 32—Adjusting screw; 33—Threaded section 34—Adjustment base 40—Display.

DETAILED DESCRIPTION

In the description of this application, it should be noted that the orientation or positional relationship indicated by the terms "center", "upper", "lower", "left", "right", "vertical", "horizontal", "inner", "outer" etc. is based on the orientation or positional relationship shown in the drawings, which is only for the convenience of describing the application and simplifying the description, but does not indicate or imply that the referred position or element must have a specific orientation, be constructed and operated in a specific orientation, and thus should not be construed as limiting the application.

In the description of this application, it should be noted that unless otherwise specified and limited, the terms "installation", "connection", and "connected" should be understood in a broad sense, for example, it can be a fixed connection, a detachable connection, or an integral connection; it can be a mechanical connection or an electrical connection; It can be directly connected, or indirectly connected through an intermediary, and can be internally connected between two elements. Those of ordinary skill in the art can understand the specific meanings of the above terms in this application depending on the specific circumstances.

As shown in FIGS. 1-6, the present application discloses a constant force lifting bracket, comprising a fixed bracket 10 and a lifting slide seat 20, the lifting slide seat 20 is connected to the fixed bracket 10 by sliding up and down. The fixed bracket 10 is provided with a wheel 21 and a movable block 24, and a side wall of one side of the wheel 21 is provided with a cam22, an arc surface 23 with a gradually increasing or decreasing radius of curvature is formed on the peripheral side of the cam 22. Specifically in this embodiment, the radius of curvature of the arc surface 23 gradually increases in the clockwise direction, the movable block 24 is connected with the lifting slide seat 20 by passing a pull cord 25 around the cam 22 and the wheel 21 in turn, an end of the pull cord 24 close to the movable block 24 is sleeved with a pressure spring 26, an upper end of the pressure spring 26 abuts against the fixed bracket 10, and a lower end of the pressure spring 26 abuts against the movable block 24.

An elastic force adjustment assembly 30 is provided on the fixed bracket 10, and the elastic force adjustment assembly 30 comprises a lifting block 31 and an adjustment screw 32, the adjusting screw 32 extends vertically and is rotatably connected with the fixed bracket 10, the threaded section 33 of the adjusting screw 32 is threadedly connected with the lifting block 31, and the upper end of the pressure spring 26 abuts against the lifting block 31. By arranging the elastic force adjustment assembly 30, when the adjusting screw 32 is rotated to drive the lifting block 31 to move down, the lifting block 31 pushes down to make the pressure spring 26 shrink, and the elastic force increases; otherwise, when the lifting block 31 moves upward, the elastic force of the pressure spring 26 decreases. When the lifting slide 20 carries display screens 40 with different weights, the matching elastic force can be adjusted correspondingly, which has good versatility.

The lifting block 31 comprises a limiting groove 311 with an opening facing downward, the upper end of the pressure spring extends into the limiting groove 311, and the limiting groove 311 comprises a give way through hole for the pull cord 312 to pass upward. The pressure spring 26 can be restricted from lateral shaking by setting the limiting slot 311 to improve stability. An adjustment base 34 is fixed on the fixed bracket 10, and the adjustment screw 32 is rotatably connected to the adjustment base 34.

A vertically extending sleeve 27 is provided on the fixed bracket 10, and the sleeve 27 comprises a guide groove 28 adapted to the movable block 24, wherein when assembling, the movable block 24 is placed in the guide groove 28 and can move up and down along the guide groove 28, and the lower end of the pressure spring 26 extends into the guide groove 28. By setting the guide groove 28, using the guiding effect of the guide groove 28 on the movable block 24, and constraining the movable block 24 laterally; the movable block 24 moves more smoothly and stably, thereby making the up and down movement of the lifting slide 20 more stable. The guide groove 28 runs through the lower end surface of the sleeve 27. By setting the guide groove 28 through the lower end surface of the sleeve 27. After assembling, it is possible to observe whether the movable block 24 moves smoothly in the guide groove 28 through the opening at the lower end, which facilitates the processing of the sleeve 27 and reduces the weight.

One side of the fixed bracket 10 is provided with a concave accommodating groove 11, and the lifting slide seat 20, the wheel 21 and the pressure spring 26 are all arranged in the accommodating groove 11. By arranging the accommodating groove 11, the lifting slide 20, the wheel 21 and the pressure spring 26 are all arranged in the accommodating groove 11, so that the product has a compact structure, takes up little space, and is simple and beautiful; A left and right side walls in the accommodation groove 11 are provided with steel ball slide rails 12, and the lifting slide seat 20 is slidably connected with the fixed bracket 10 up and down through the steel ball slide rails 10. The lower end of the fixed bracket 10 is connected with a base 13.

Figure 4:
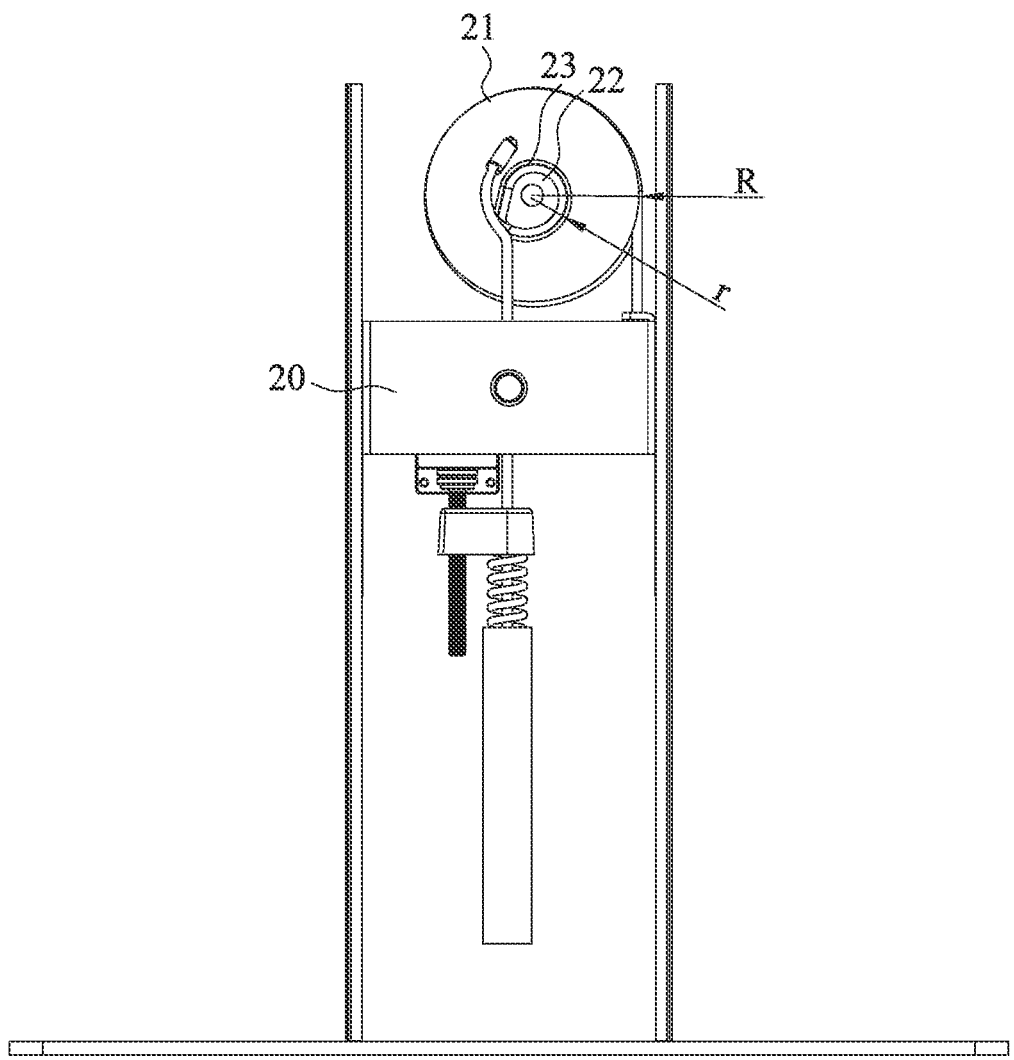
FIG. 4 is the use state reference diagram of the embodiment of the present application.
Figure 5:
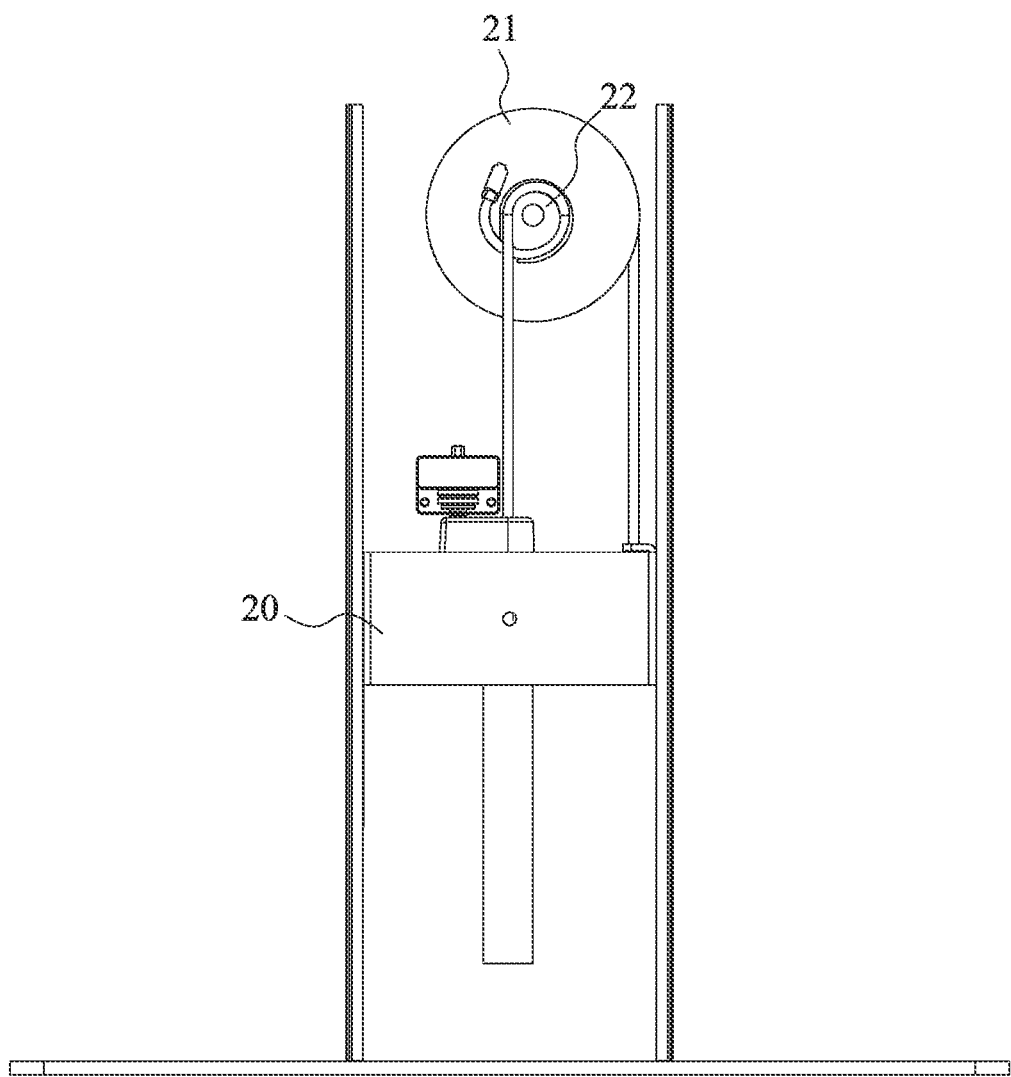
FIG. 5 is another usage status reference diagram of the embodiment of the present application.
Figure 6:
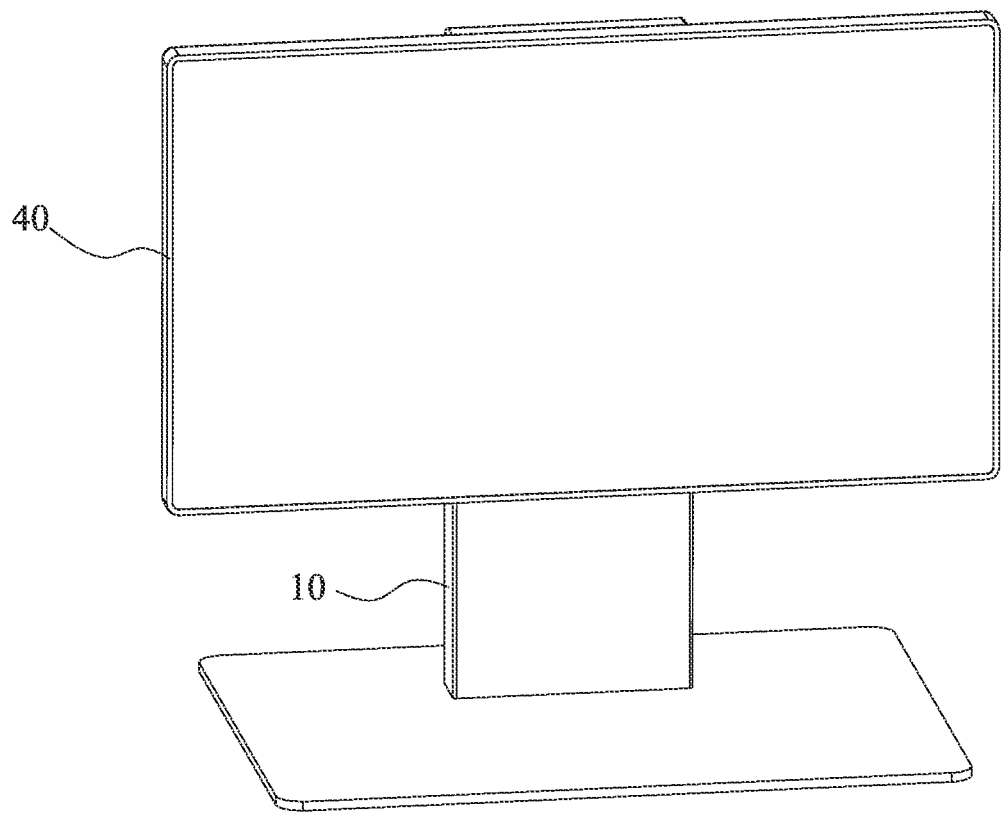
FIG. 6 is a schematic diagram of an embodiment of the present application applied to a display screen.

Referring to FIGS. 4-6, the working principle of the present application is: the weight of the display screen 40*the radius R of the wheel 21=the elastic force of the pressure spring 26*the radius of curvature r.

When the display screen 40 moves down, the wheel 21 and the cam. 22 rotate clockwise, and the pull cord 25 pulls the pressure spring 26 upward to shrink the pressure spring 26, and the elastic force gradually increases, while the curvature radius r of the arc surface 3 of the cam 22 gradually decreases. If the product of the elastic force and the radius of curvature r remains constant and is equal to the product of the weight of the display screen 40 and the radius R of the wheel 21, the display screen 40 can be kept balanced at any height, thereby realizing hovering at any height.

It should be noted that this application is applicable to the display screen 40 but not limited to this field.

In summary, in the present application, the lifting slide seat 20, the wheel 21, the movable block 24 and the pressure spring 26 are set on the fixed bracket 10, and a side wall of one side of the wheel 21 is provided with a cam22, the movable block 24 is connected with the lifting slide seat 20 by passing a pull cord 25 around the cam 22 and the wheel 21, the pressure spring 26 is sleeved on the pull cord 25 and the two ends of the pressure spring 26 abut against the fixed bracket 10 and the movable block 24 respectively, thereby fixing the display screen 40 on the lifting slide 20. When moving the display screen 40 up and down, there is always the weight of the display screen 40*the radius R. of the wheel 21=the elastic force of the pressure spring 26*the radius of curvature r, so that the height adjustment of the display screen 40 can be realized, and enable the screen to hover at any height, which is more convenient to use; at the same time, the structure is simple and the manufacturing cost is low, which is conducive to popularization and use; By arranging the elastic force adjustment assembly 30 composed of the lifting block 31 and the adjusting screw 32, the upward and downward movement of the lifting block 31 can fine-tune the elastic force of the pressure spring 26. When the lifting slide seat 20 carries the display screens 40 with different weights, the matching elastic force can be adjusted correspondingly, which has good versatility and high height adjustment accuracy.

The above descriptions are only preferred embodiments of the present application, and are not intended to limit the present application. Therefore, any modification, equivalent replacement, improvement, etc. made to the above embodiments based on the technical practice of the present application still fall within the scope of the technical solution of the present application.

What is claimed is:

1. A constant force lifting bracket, comprising a fixed bracket and a lifting slide seat, the lifting slide seat is connected to the fixed bracket by sliding up and down, the fixed bracket is provided with a wheel and a movable block, and a side wall of one side of the wheel is provided with a cam, and the movable block is indirectly connected to the lifting slide seat by passing a pull cord around the cam and the wheel in turn, an end of the pull cord close to the movable block is sleeved with a pressure spring, and a lower end of the pressure spring abuts against the movable block;
   - wherein an elastic force adjustment assembly is provided on the fixed bracket, and the elastic force adjustment assembly comprises a lifting block and an adjustment screw, the adjustment screw extends vertically and is rotatably connected with an adjustment base, the threaded section of the adjusting screw is threadedly connected with the lifting block, and the upper end of the pressure spring abuts against the lifting block;
   - wherein the adjustment base is fixed on the fixed bracket, and the adjustment screw is rotatably connected to the adjustment base.

2. The constant force lifting bracket according to claim 1, wherein the lifting block comprises a limiting groove with an opening facing downward, the upper end of the pressure spring extends into the limiting groove, and the limiting groove comprises a give way through hole for the pull cord to pass upward.

3. The constant force lifting bracket according to claim 1, wherein a vertically extending sleeve is provided on the fixed bracket, and the sleeve comprises a guide groove adapted to the movable block, wherein when assembling, the pressure spring is placed in the guide groove and can be elastically expanded and deformed up and down along the guide groove, and the lower end of the pressure spring extends into the guide groove.

4. The constant force lifting bracket according to claim 3, wherein the guide groove runs through the lower end surface of the sleeve.

5. The constant force lifting bracket according to claim 1, wherein an arc surface with a gradually increasing or decreasing radius of curvature is formed on the peripheral side of the cam.

6. The constant force lifting bracket according to claim 1, wherein one side of the fixed bracket is provided with a concave accommodating groove, and the lifting slide seat, the wheel and the pressure spring are all arranged in the accommodating groove.

7. The constant force lifting bracket according to claim 6, wherein a left and right side walls in the accommodation groove are provided with steel ball slide rails, and the lifting slide seat is slidably connected with the fixed bracket up and down through the steel ball slide rails.

8. The constant force lifting bracket according to claim 1, wherein the lower end of the fixed bracket is connected with a base.

* * * * *